United States Patent
Hristov et al.

(10) Patent No.: US 8,960,078 B2
(45) Date of Patent: Feb. 24, 2015

(54) REUSABLE BEVERAGE CARTRIDGE

(71) Applicant: Keurig, Incorporated, Reading, MA (US)

(72) Inventors: Stoyan Hristov, Billerica, MA (US); Yoav Rabino, Newton, MA (US); James E. Shepard, Marblehead, MA (US)

(73) Assignee: Keurig Green Mountain, Inc., Waterbury, VT (US)

( * ) Notice: Subject to any disclaimer, the term of this patent is extended or adjusted under 35 U.S.C. 154(b) by 10 days.

(21) Appl. No.: 13/804,504

(22) Filed: Mar. 14, 2013

(65) Prior Publication Data

US 2014/0272048 A1    Sep. 18, 2014

(51) Int. Cl.
*A47J 31/44* (2006.01)
*A47J 31/40* (2006.01)
*A47J 31/06* (2006.01)
*A47J 31/36* (2006.01)

(52) U.S. Cl.
CPC .............. *A47J 31/446* (2013.01); *A47J 31/407* (2013.01); *A47J 31/0673* (2013.01); *A47J 31/0689* (2013.01); *A47J 31/3628* (2013.01); *A47J 31/3633* (2013.01); *A47J 31/3695* (2013.01)
USPC .................... 99/323; 99/295; 99/317; 426/79

(58) Field of Classification Search
USPC .............. 426/433, 79, 431, 435; 99/295, 317, 99/323
See application file for complete search history.

(56) References Cited

U.S. PATENT DOCUMENTS

| | | | |
|---|---|---|---|
| 6,607,762 B2 | 8/2003 | Lazaris et al. | |
| 6,658,989 B2 | 12/2003 | Sweeney et al. | |
| 7,328,651 B2 | 2/2008 | Halliday et al. | |
| 7,513,192 B2 * | 4/2009 | Sullivan et al. | ............. 99/289 R |
| 7,591,218 B2 | 9/2009 | Bunn et al. | |
| 8,033,211 B2 | 10/2011 | Halliday et al. | |
| 8,087,347 B2 | 1/2012 | Halliday et al. | |
| 8,221,813 B2 | 7/2012 | Boul | |
| 8,361,527 B2 | 1/2013 | Winkler et al. | |
| 2009/0117239 A1 | 5/2009 | Bunn et al. | |
| 2009/0229470 A1 | 9/2009 | Dorfmueller | |

(Continued)

FOREIGN PATENT DOCUMENTS

| | | |
|---|---|---|
| DE | 102007028674 A1 | 8/2008 |
| DE | 102010048514 A1 | 4/2012 |

(Continued)

OTHER PUBLICATIONS

Selected portion of http://www.solofill.com/solofill-cup-v2-gold/, unknown publication date, retrieved Nov. 14, 2013, 1 page.

(Continued)

*Primary Examiner* — Anthony Weier
(74) *Attorney, Agent, or Firm* — Wolf, Greenfield & Sacks, P.C.; Robert E. Hunt

(57) ABSTRACT

A reusable cartridge and method for forming a beverage using a beverage machine. The cartridge may include a bottom surface with inlet and outlet openings, e.g., arranged to receive an inlet or outlet needle, respectively, and an opening at a top end through which access to the interior space may be had. A filter basket may be inserted or removed into the interior space through the opening and a cover may engage at top to seal the opening closed.

14 Claims, 12 Drawing Sheets

(56) References Cited

U.S. PATENT DOCUMENTS

| | | | |
|---|---|---|---|
| 2010/0028495 A1* | 2/2010 | Novak et al. | 426/77 |
| 2011/0076361 A1* | 3/2011 | Peterson et al. | 426/79 |
| 2011/0151075 A1* | 6/2011 | Peterson | 426/238 |
| 2011/0303095 A1 | 12/2011 | Fu et al. | |
| 2012/0058226 A1 | 3/2012 | Winkler et al. | |
| 2012/0093989 A1 | 4/2012 | Petitpas | |
| 2012/0285330 A1 | 11/2012 | Demiglio et al. | |
| 2012/0285334 A1 | 11/2012 | DeMiglio et al. | |
| 2013/0017303 A1 | 1/2013 | Vu | |
| 2013/0025466 A1 | 1/2013 | Fu et al. | |
| 2013/0142930 A1* | 6/2013 | Rabin | 426/431 |
| 2014/0072675 A1* | 3/2014 | Norton et al. | 426/111 |

FOREIGN PATENT DOCUMENTS

| | | | |
|---|---|---|---|
| EP | 1440639 | * | 7/2004 |
| GB | 2485575 | A | 5/2012 |
| WO | WO 2012/142949 | A1 | 10/2012 |
| WO | WO 2013007776 | A1 | 1/2013 |

OTHER PUBLICATIONS

International Search Report and Written Opinion dated Jul. 7, 2014 from corresponding PCT Application No. PCT/US2014/020503.

* cited by examiner

REUSABLE BEVERAGE CARTRIDGE

BACKGROUND

1. Field of Invention

This invention relates to beverage forming systems, such as coffee brewers that use a liquid to form a coffee beverage.

2. Related Art

Beverage forming systems that use a liquid, such as water, to form a beverage are well known. For example, U.S. Pat. No. 8,033,211 discloses a beverage forming system that uses a beverage cartridge containing a beverage material to make a beverage by introducing liquid into the cartridge.

SUMMARY OF INVENTION

Aspects of the invention relate to methods and apparatus for using a cartridge to make a beverage in a beverage forming machine. The cartridge may be reusable, e.g., may be loaded with beverage material, such as ground coffee, used to make a beverage, and then reloaded with fresh beverage material and used again to make another beverage. The cartridge may be usable with a beverage machine that employs inlet and/or outlet piercing elements, such as needles, that are intended to pierce a single-use cartridge to form inlet and outlet openings in the cartridge. Thus, the cartridge, though reusable, may not require that the beverage machine be reconfigured for use with the cartridge, e.g., by removing the piercing elements from the machine to accommodate the reusable cartridge. Also, the cartridge may be used with machines designed to pierce a cartridge on a same side, such as at the lid, to form inlet and outlet openings, and need not be precisely aligned with the piercing elements by a user. Instead, the cartridge may be placed in a cartridge holder that is in the open position, and the cartridge holder may be closed to enclose the cartridge and insert the piercing elements into the cartridge. Inlet and outlet openings to receive the piercing elements may be provided on a same side of the cartridge, e.g., at the bottom, which may be rigid. Access to the cartridge interior, e.g., for loading beverage material, may be made on a side of the cartridge opposite the inlet and outlet openings. Thus, the portion of the cartridge that interfaces with the cartridge holder and piercing elements of the beverage machine may be made stable and fixed relative to each other, helping to ensure that the piercing elements can be properly received when the cartridge holder is closed.

In one aspect of the invention, a reusable beverage cartridge for use in a beverage forming machine includes a cartridge body having a bottom with a flat surface, a top, a sidewall extending between the bottom and the top, and an interior space. The bottom may include an inlet opening and an outlet opening each arranged to respectively receive an inlet needle and an outlet needle of a beverage forming machine such that the inlet opening can receive an inflow of liquid from the inlet needle and the outlet opening can provide a beverage to the outlet needle. The top of the body may have an opening that provides access to the interior space, e.g., to hold a filter basket. The filter basket may define a beverage material space in which to hold a beverage material used to form a beverage, and have a top opening through which the beverage material space is accessible, e.g., to remove spent beverage material from the filter basket and/or provide fresh beverage material into the space. An inlet of the filter basket may be arranged to receive liquid into the beverage material space, and a filter portion may allow flow of beverage out of the beverage material space. Both the inlet and the filter portion may include a screen or other filter component, such as a wire mesh, but may be arranged in other ways. For example, the inlet may include one or more holes through which liquid can flow. The filter basket may be receivable into the interior space of the cartridge body through the opening of the cartridge body, e.g., so that liquid provided at the inlet opening may flow into the filter basket to form a beverage. A cover may be arranged to removably engage with the top of the cartridge body at the opening to seal the opening of the body closed, e.g., so that the interior space is sealed water tight at the opening. The cover may be removable from the cartridge body to allow removal of the filter basket from the interior space, e.g., for replacement with another filter basket and/or recharging with beverage material.

In one embodiment, the cover seals the top opening of the filter basket closed when engaged with the cartridge body opening. For example, the filter basket may include a rim around the top opening that engages with a portion of the body that defines the opening of the body, and the cover may press the rim into contact with the body to form a water tight seal. The cover may also contact the rim to form a water tight seal between the cover and rim.

The cartridge bottom may include first and second flat surfaces that are parallel and not co-planar, e.g., one surface may be recessed relative to the other surface. In one embodiment, the first flat surface includes the outlet opening and the second flat surface may include the inlet opening. The second flat surface may be nearer the cartridge body top than the first flat surface, e.g., may be recessed relative to the first flat surface. Such an arrangement may aid in ensuring that inlet and outlet needles are properly received by the inlet and outlet openings. For example, one needle may enter a corresponding opening first, before the other needle enters its corresponding opening, requiring the cartridge to be aligned with only one needle at a time. After the first needle is received into its corresponding opening, the other needle may enter its opening. In one embodiment, the outlet opening is near a periphery of the bottom and the inlet opening is near a center of the bottom, though other arrangements are possible.

The filter basket may include a bottom that is spaced above the inlet opening with the filter basket received in the interior space, e.g., so that the filter basket bottom is positioned out of contact with an inlet needle received into the inlet opening. In one arrangement, the filter basket has a bottom surface opposite the top opening that seals to an interior surface of the body to define an inlet flow path between the inlet opening and the filter basket inlet. Thus, liquid introduced into the inlet opening may flow via a flow path defined in part by the filter basket to the filter basket inlet. For example, the filter basket inlet may be located at a bottom of the filter basket, and the bottom surface of the filter basket may include an annular portion that seals with a portion of the cartridge body. The body may include an inlet chamber in the interior space between the inlet opening and a sealing surface that engages the annular portion of the bottom of the filter basket. While the filter basket may be arranged in a variety of ways, the filter basket may be cylindrical in shape with the top opening located at one end of the cylindrical shape. The filter portion may be located in an upper portion of the sidewall of the cylindrical shape near the top opening. Thus, the filter basket may be arranged in the interior space such that liquid introduced into the inlet opening flows upwardly through the inlet into the beverage material space of the filter basket, flows outwardly through the filter portion and flows downwardly to the outlet opening of the body. Flow of beverage to the outlet opening may in part be along a spout portion of the body sidewall that is in communication with the outlet opening.

In another aspect of the invention, a method of using a reusable beverage cartridge to form a beverage includes inserting a filter basket containing beverage material through an opening in a top of a cartridge body to place the filter basket in an interior space of the body. A cover may then be engaged with the top opening of the body to seal the top opening closed, and the body may be placed into a cartridge holder of a beverage forming machine such that a bottom of the body is exposed with the cartridge holder in the open position. For example, the bottom may be positioned such that it faces toward the front of the beverage machine and is in an upwardly inclined orientation. The cartridge holder may then be moved to a closed position to insert an inlet needle into an inlet opening in the bottom of the body and to insert an outlet needle into an outlet opening in the bottom of the body. For example, a handle of the machine may be operated to move the cartridge holder and cartridge to a closed position in which the bottom of the cartridge is in a downwardly inclined orientation. Liquid may be introduced into the interior space of the body via the inlet opening, e.g., so that liquid flows upwardly into the cartridge body. Beverage may be received from the body via the outlet opening, e.g., as the beverage flows downwardly from the cartridge.

These and other aspects of the invention will be apparent from the following description and claims.

BRIEF DESCRIPTION OF DRAWINGS

Aspects of the invention are described below with reference to the following drawings in which like numerals reference like elements, and wherein.

DETAILED DESCRIPTION

It should be understood that aspects of the invention are described herein with reference to certain illustrative embodiment and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention.

In accordance with an aspect of the invention, a reusable cartridge may have both inlet and outlet openings at a bottom of the cartridge body, and a removable cover at a top of the cartridge body may be removed to allow access to the interior space of the body. A filter basket may be received in the interior space, and be arranged to hold a beverage material so that liquid introduced into the body via the inlet opening may mix with the beverage material to form a beverage. The beverage may pass through a filter portion of the filter basket and flow to the outlet opening for exit from the cartridge. The filter basket may be removable from the body, e.g., for cleaning or replacement. For example, different filter baskets may be used for different beverage operations. As one example, one filter basket may provide suitable backpressure and filter pore sizes suitable for making an espresso coffee, while another filter basket may be used for making a standard, American-style coffee. The cartridge may be arranged to cooperate with inlet and outlet needles of a beverage forming machine that extend into the inlet and outlet openings, respectively, and thus may be used with a beverage forming machine that is also designed to operate with single-use cartridges that are pierced to form inlet and outlet openings. The cartridge may be used to form a beverage with the bottom in a downwardly inclined orientation, e.g., so that the bottom is arranged at an angle of about 5-85 degrees below the horizontal.

Figure 1:
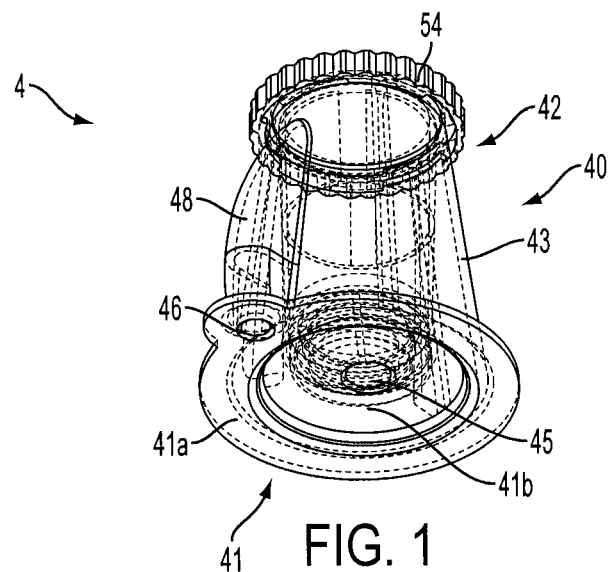
FIG. 1 is a bottom perspective view of a beverage cartridge in an illustrative embodiment.

FIG. 1 shows a bottom perspective view of a cartridge 4 that incorporates aspects of the invention. In this embodiment, the cartridge includes a body 40 having a bottom 41 at one end, a top 42 at the opposite end, and a sidewall 43 extending between the top 42 and bottom 41. Although not seen in this view, the body 40 defines an interior space 44 that is accessible through an opening 47 at the top 42 of the body 40. The opening 47 can be closed by a cover 54 that engages with the top 42 of the body 40, e.g., to seal the body 40 closed at the top 42. In this embodiment, the cover 54 engages the top 42 by a threaded connection, but other arrangements are possible such as an interference fit, snap fit, etc. The sidewall 43 includes a spout 48 in this embodiment, but the sidewall 43 could be shaped or otherwise formed in other ways. In this embodiment, and as discussed more below, the spout 48 may help orient the cartridge 4 with respect to a cartridge holder 3 of a beverage machine so that inlet and outlet openings 45, 46 at the bottom 41 are properly aligned to communicate with inlet and outlet needles or other ports of the machine. The bottom 41 may include a first flat surface 41a, which in this case includes the outlet opening 46 and extends around a periphery of the bottom 41. The bottom 41 may also include a second flat surface 41b which is located near a center of the bottom 41 and includes the inlet opening 45. These flat surfaces 41a, 41b may be parallel to each other, yet not be co-planar, i.e., are arranged at different distances from the top 42. Although the flat surfaces are generally flat in an overall sense, the surfaces may be textured, ridged, or otherwise have a rough or irregular surface treatment, and need not necessarily be completely smooth.

Figure 2:
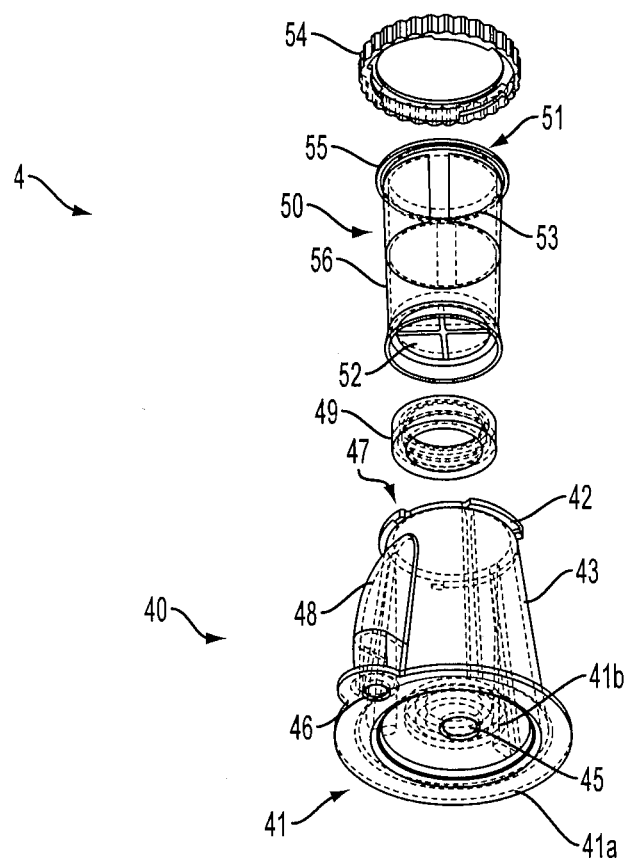
FIG. 2 is an exploded view of the FIG. 1 embodiment.

FIG. 2 shows an exploded view of the cartridge 4, illustrating that the interior space 44 of the body 4 may receive a filter basket 50. In this embodiment, the filter basket 50 has a cylindrical shape with a sidewall 56 having a filter portion 53 through which beverage formed in a beverage material space 57 inside the filter basket 50 may flow. The filter portion 53 may be formed by a wire or plastic mesh that is joined to the sidewall 56 (e.g., formed as a molded plastic part) of the filter basket 50, or may be formed in other ways, such as by perforating the sidewall 56. Alternately, the entire filter basket 50 may be made of a wire or plastic mesh material, as the filter basket may be made in any suitable way. A bottom of the filter basket 50 includes an inlet 52 that is arranged to allow the inflow of liquid into the beverage material space 57 provided via the inlet opening 45, though liquid may enter the filter basket 50 through the sidewall or top. A flow path from the inlet opening 45 to the inlet 52 may be provided in any suitable way, and in this embodiment is provided, at least in part, by a sealing surface 49 that is arranged to define an inlet chamber in the interior space 44. The inlet chamber may receive an inlet needle that extends into the inlet opening 45 and conduct liquid flow to the filter basket inlet 52. In addition, the sealing surface 49 may engage with the bottom of the filter basket 50, e.g., at an annular surface around the inlet 52, to suitably seal with the filter basket 50 so that liquid flows as desired from the inlet opening 45 into the inlet 52. The sealing surface 49 may be, or include an o-ring or other resilient gasket material that can sealingly engage with the filter basket 50, as well as possibly with an interior surface of the body 40 near the inlet opening 45. In another embodiment, the sealing surface 49 may simply include a surface in the interior space 44 (e.g., a molded plastic surface) that can suitably mate with the filter basket 50.

The top of the filter basket 50 has a top opening 51 through which the beverage material space 57 can be accessed, e.g., to provide beverage material into the filter basket 50. A rim 55 may be arranged around the top opening 51, and may be arranged to engage with a portion of the body 40 that defines the opening 47 of the body 40. For example, the rim 55 may rest on a rim of the body 40 that defines the opening 47, acting as a stop with respect to movement of the filter basket 50 into the interior space 44 of the body 40. The cover 54 may engage the top surface of the rim 55 and press the rim 55 into sealing engagement with the body 40 when the cover 54 is tightened. Note, however, that other arrangements are possible, e.g., the rim 55 need not be provided and the filter basket 50 may be provided with a gasket around its upper periphery that engages with an inner side wall at the opening 47. With a rimless filter basket 50, the cover 54 may form a seal with the body 40 directly, and/or the cover 54 may engage with the outside diameter or other portion of the basket 50 to form a suitable seal.

In this embodiment, the filter portion 53 is located in an upper portion of the sidewall 56 of the cylindrical shape of the filter basket 50 near the top opening 51. This arrangement may help the full wetting or other contact of beverage material in the beverage material space 47 with liquid that enters the inlet 52, e.g., because the liquid is forced to flow upwardly in the beverage material space 47 before exiting the space 47 through the filter portion 53. However, the filter portion 53 may extend further down toward, or otherwise be located nearer the bottom of the filter basket 50, if desired. Also, while the filter portions 53 in this embodiment have approximately rectangular shapes (wrapped around the cylindrical sidewall), other arrangements are possible, such as circular, annular, irregular or other shaped filter portions 53.

Figure 3:
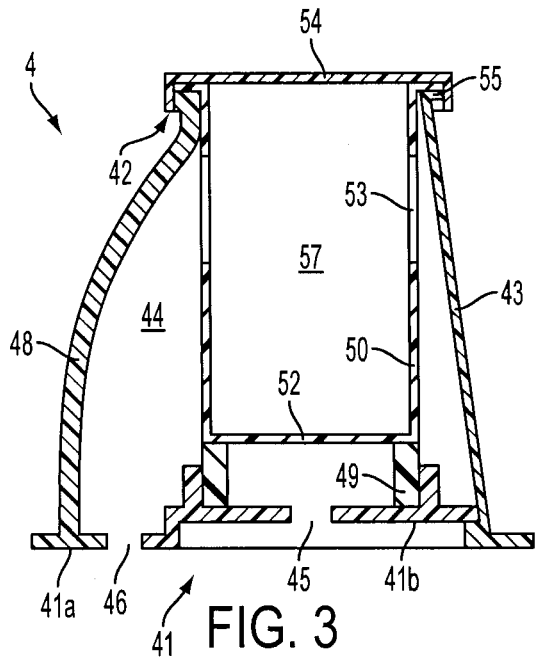
FIG. 3 is a cross-sectional view of the FIG. 1 embodiment.

FIG. 3 shows a cross sectional view of the cartridge 4. This view more clearly illustrates how the first and second flat surfaces 41a, 41b are not co-planar and are arranged at different distances from the top 42 of the body, with the second surface 41b being closer to the top 42. Also, the sealing surface 49, which again may include an o-ring or other gasket along with a molded part of the body 40 (or not), defines an inlet chamber between the inlet opening 45 and the inlet 52 at the bottom of the filter basket 50. This inlet chamber may receive an inlet needle that extends through the inlet opening 45 and provide a flow path for liquid from the inlet opening 45 to the inlet 52. Since the bottom of the filter basket is spaced above the inlet opening 45, the filter basket may avoid contact with an inlet needle that extends into the interior space 44. FIG. 3 also shows that the spout 48 portion of the interior space 44 communicates with the outlet opening 46, e.g., such that beverage that flows outwardly through the filter portions 53 is conducted in the interior space 44 toward the spout 48 and the outlet opening 46. Thus, the filter basket and other portions of the cartridge may be arranged such that liquid introduced into the inlet opening 45 flows upwardly through the inlet 52 into the beverage material space 47 of the filter basket 50, flows outwardly through the filter portion 53 and flows downwardly to the outlet opening 46 of the body 40.

Figure 4:
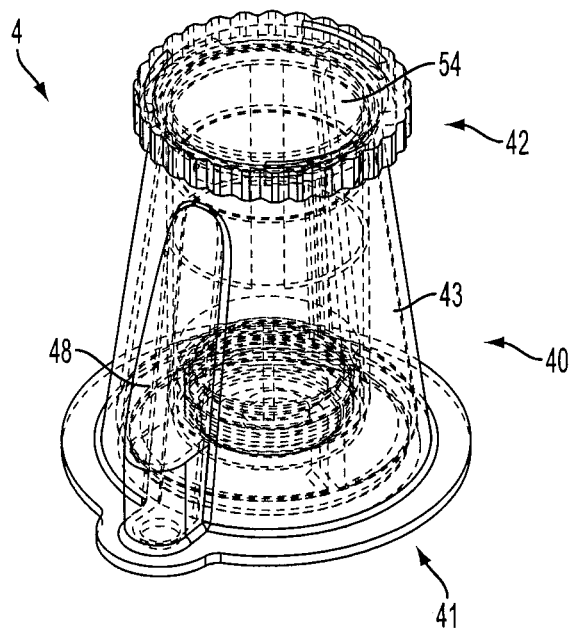
FIG. 4 is a top perspective view of the FIG. 1 embodiment.

FIG. 4 shows a top perspective view of the cartridge 4 and helps illustrate that the spout 48 may also provide a kind of handle or gripping surface for a user when removing or tightening the cover 54 on the body 40. For example, a user may hold the bottom 41 of the body 40 down on a surface, such as a countertop, grasping the sidewall 43 and spout 48 to help prevent rotation of the body 40. Thereafter, the cover 54 may be turned relative to the body 40, either for tightening or loosening the cover 54. As noted above, however, the cover 54 may engage the body 40 in other ways, such as by an interference or friction fit, by a hinge and clasp mechanism, and others.

Figure 5:
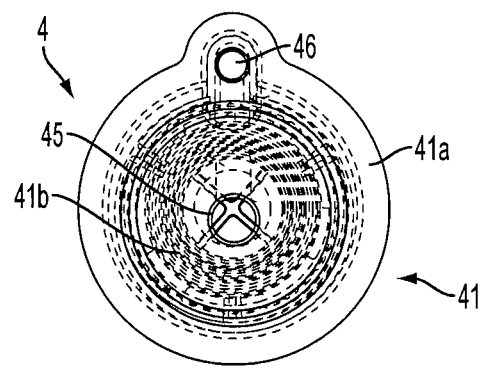
FIG. 5 is a bottom view of the FIG. 1 embodiment.

FIG. 5 shows a bottom view of the cartridge and illustrates that the inlet opening 45 may be arranged near a center of the bottom 41 with the outlet opening 46 arranged near a periphery of the bottom 41. Of course, other configurations are possible, e.g., the inlet and outlet openings may be arranged in other locations on the bottom 41 depending on inlet and outlet needle locations, if used, on the beverage machine.

Figure 6:
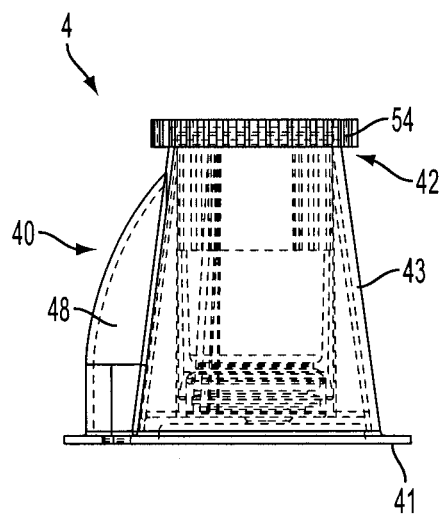
FIG. 6 is a side view of the FIG. 1 embodiment.
Figure 7:
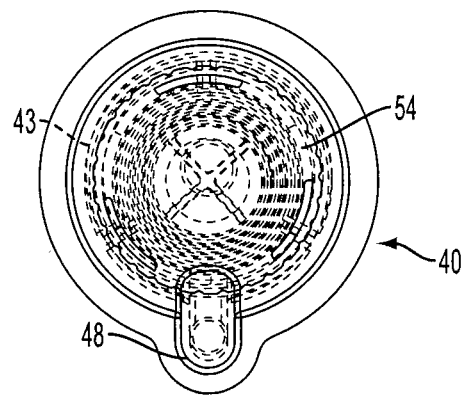
FIG. 7 is a top view of the FIG. 1 embodiment.

FIGS. 6 and 7 show side and top views of the cartridge 4 and help illustrate that the cover 54 may be smaller in size than the bottom 41. This arrangement may provide for the ability to place the cartridge in a cartridge holder that receives a cartridge top-first For example, the cartridge holder may include an opening through which all or most of the cartridge is inserted so that the holder can support the cartridge in the opening. If the cover 54 were larger than the bottom 41, this placement may be made difficult or impossible, as will be explained in more detail below.

Figure 8:
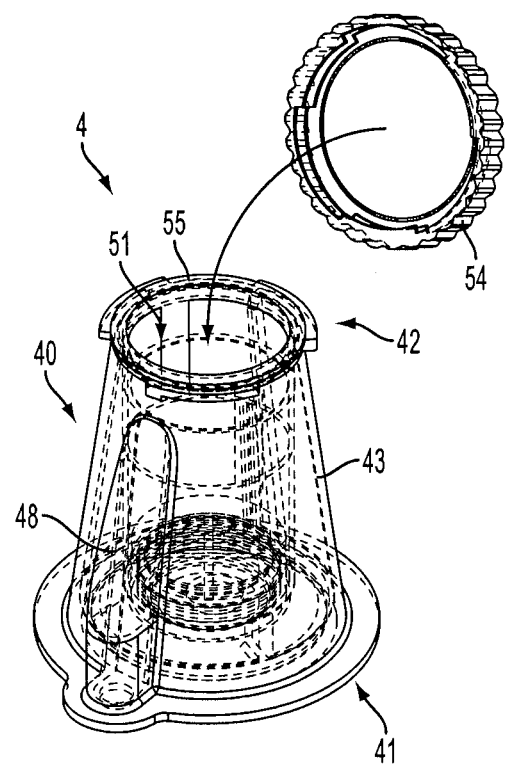
FIG. 8 illustrates a first step in accessing an interior space of the cartridge of FIG. 1.
Figure 9:
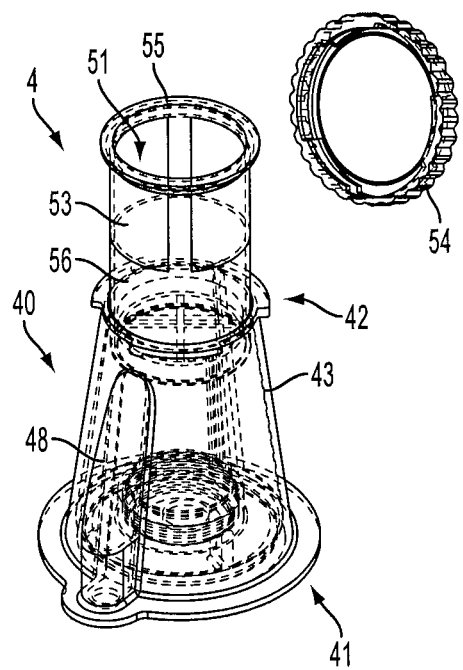
FIG. 9 illustrates removal of the filter basket in the cartridge of FIG. 1.

FIGS. 8 and 9 illustrate how the cartridge 4 may be used to receive a beverage material and may be reused two or more times to make a beverage. In FIG. 8, the cover 54 may be removed, exposing the filter basket 50. The filter basket 50 may be removed from the interior space 44, e.g., by gripping the rim 55 and pulling upward. Removal may allow a user to dump used beverage material from the filter basket, as well as to clean the filter basket and the interior of the body 40. With fresh beverage material placed into the beverage material space 57 through the top opening 51, the filter basket 50 may be re-inserted through the opening 47 and the cover 54 placed on the body 40. By tightening the cover 54, the cover 54 may form a seal between the rim 55 and the top 42 of the body 40, as well as form a seal between the bottom of the filter basket 50 and the sealing surface 49.

In some embodiments, the filter basket 50 may not be removable, but instead may be fixed in the interior space 44. In this case, the filter basket 50 may be emptied by simply removing the cover 54 and dumping the filter basket contents. Rinsing may be completed by introducing water through the inlet opening 45 with the cover 54 removed.

Figure 10:
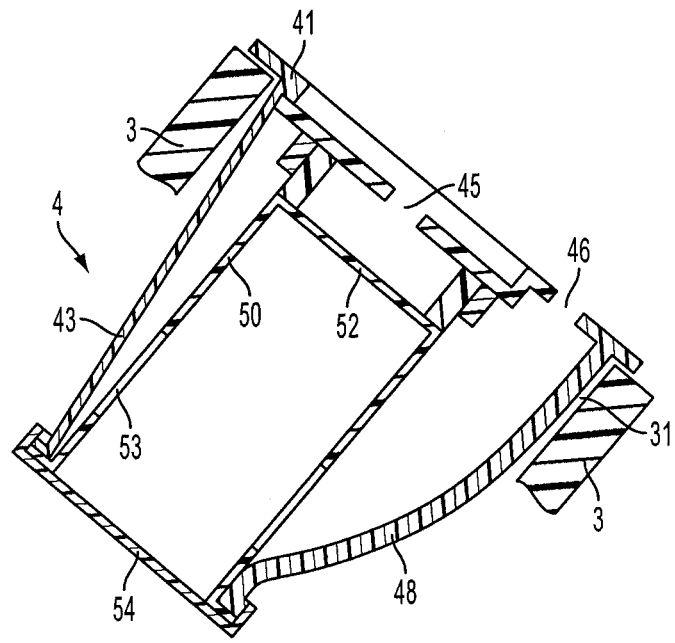
FIG. 10 is a cross sectional view of the FIG. 1 cartridge in a cartridge holder in the open position in an illustrative embodiment.

In accordance with another aspect of the invention, the cartridge may be used with a beverage forming machine to make a beverage. In one particular arrangement, the cartridge may be used with a beverage machine that has inlet and outlet needles or other piercing elements. These elements may extend into the inlet and outlet openings without damaging the cartridge and while still allowing the machine to form a proper beverage. For example, FIG. 10 shows an illustrative embodiment in which the cartridge 4 is placed in a cartridge holder 3 while the holder 3 is at an open position. (Only a small section of the cartridge holder 3 is shown in FIG. 10, but additional details regarding a suitable cartridge holder 3 and other features of a beverage forming machine 10 are provided below.) The cartridge 3 is placed into an opening 31 of the cartridge holder 3 so that the top 42 and sidewall 43 are received into and through the opening such that an outer periphery of the bottom 41 rests on the cartridge holder 3 near the opening 31. Also, the opening 31 may be shaped to have a shape that matches the outer contour of the sidewall 43, including the spout feature. Thus, the spout 48 may serve to locate the cartridge 4 rotationally relative to the cartridge holder 3. Thus, the cartridge 4 may be received into the cartridge holder 3 with the inlet and outlet openings properly positioned for receiving the inlet and outlet needles and with the bottom 41 of the cartridge 4 facing upwardly, and in fact in an upwardly inclined orientation. This orientation may allow easy placement of the cartridge as well as allow the cartridge holder 3 to safely hold the cartridge 4 without the cartridge 4 falling from the opening 31.

Figure 11:
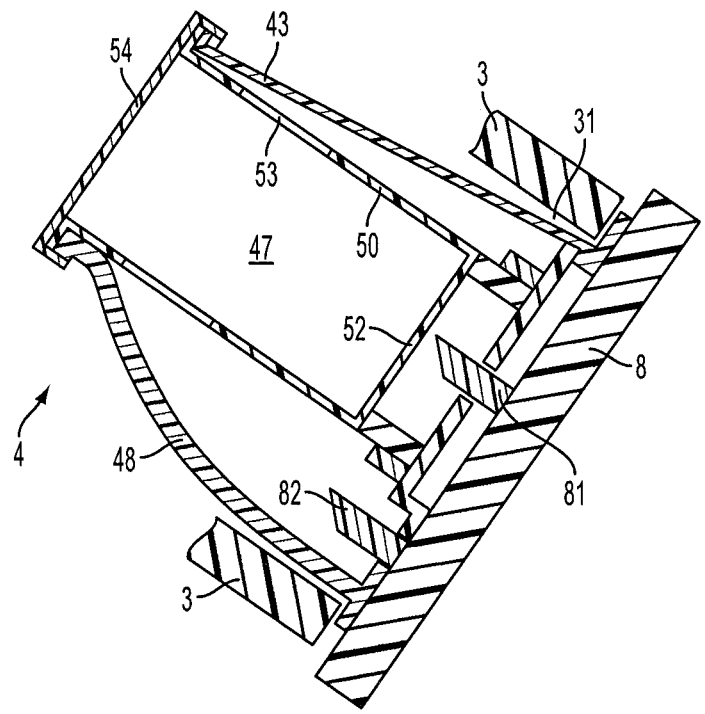
FIG. 11 is a cross sectional view of the FIG. 1 cartridge in the FIG. 11 cartridge holder in the closed position.

Thereafter, the cartridge holder 3 may be moved to the closed position shown in FIG. 11. In the closed position, the bottom 41 of the cartridge 4 faces in a downwardly inclined orientation. This allows liquid introduced into the inlet opening 45 to flow upwardly through the inlet 52 and into the beverage material space 47 so that beverage can be formed and allowed to flow outwardly through the filter portions 53 and toward the outlet opening 46. Inlet and outlet needles 81, 82 may extend into the interior space 44 of the cartridge body 40 so that liquid may be provided (via the inlet needle 81) and beverage received (via the outlet needle 82). The needles 81, 82 may be attached to a lid 8 that may cover the opening 31 of the cartridge holder 3. The lid 8 may contact the bottom 41 of the cartridge 4 to form a water tight seal between the bottom 41 and the lid 8. Alternately, or in addition, seal elements (such as a gasket) may be provided at or near (e.g., around) each needle 81, 82 and provide a suitable seal between the lid 8 and the bottom 41.

Figure 12:
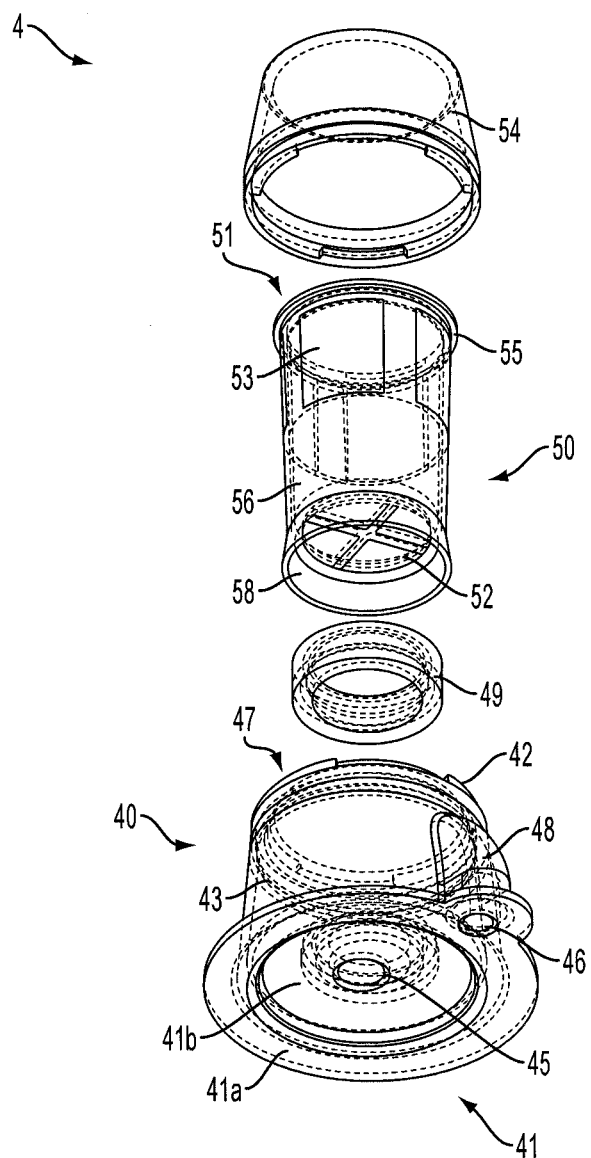
FIG. 12 is an exploded view of a cartridge in another illustrative embodiment.
Figure 13:
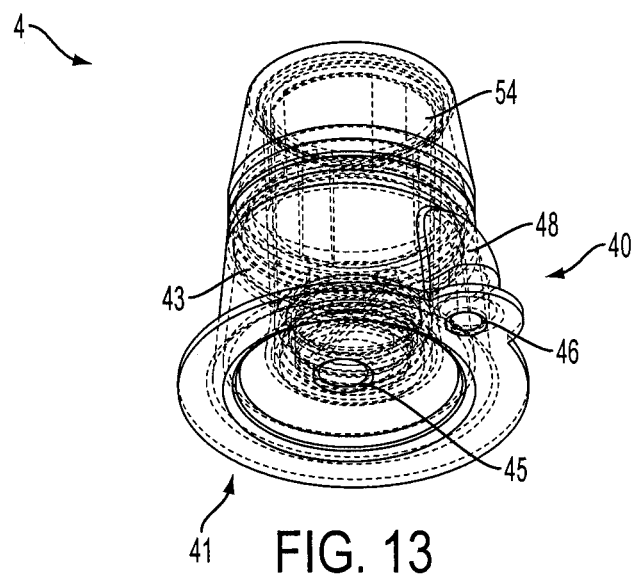
FIG. 13 is a bottom perspective view of the FIG. 12 embodiment.
Figure 14:
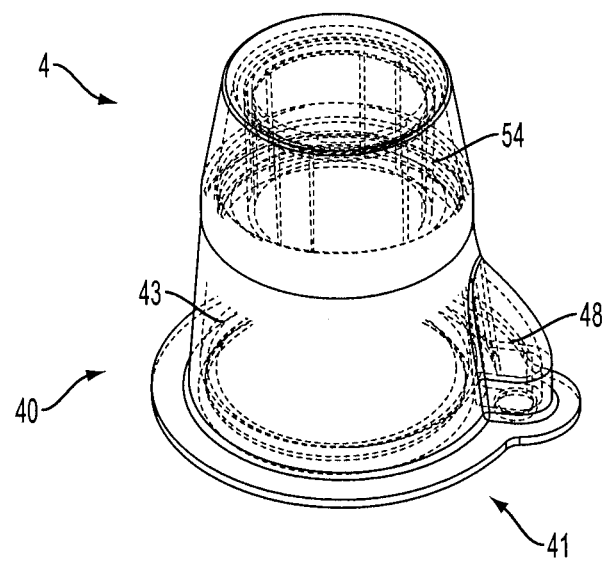
FIG. 14 is a top perspective view of the FIG. 12 embodiment.
Figure 15:
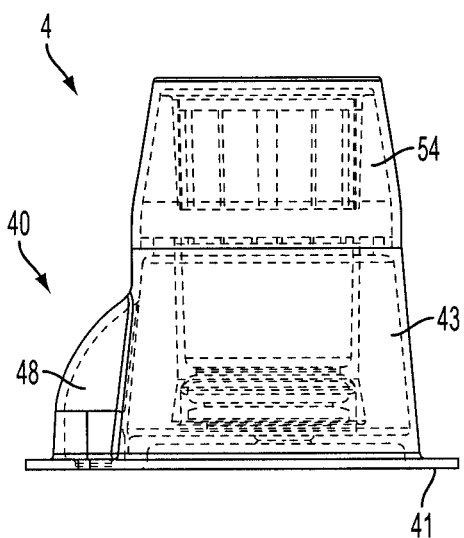
FIG. 15 is a side view of the FIG. 12 embodiment.

FIGS. 12 through 16 show another illustrative embodiment of a cartridge 4 that incorporates aspects of the invention. As can be seen in FIG. 12, this embodiment is similar to that in FIGS. 1-11, with a main difference being that the sidewall 43 of the body 40 is somewhat shorter, and the cover 54 extends downwardly to a greater extent such that the cover 54 extends along at least part of the length of the filter basket 50. Otherwise, this embodiment is nearly identical to that of FIGS. 1-11. For example, the cover 54 still engages with the body 40 to seal the opening 47 closed, but in this embodiment, no portion of the filter basket 50 is located at the engagement of the opening 47 and the cover 54. Instead, the rim 55 of the basket 50 engages with an inner surface of the cover 54 so that the top opening 51 of the filter basket 50 is sealed closed by the cover 54. That is, engagement of the cover 54 with the body 40 captures the filter basket 50 between the cover 54 and the sealing surface 9 so that the top opening 51 is closed, and the bottom of the filter basket 50 is suitably pressed into engagement with the sealing surface 9. This embodiment also includes a skirt 58 that flares outwardly at the bottom of the filter basket 50 near the inlet 52. The skirt 58 may help guide the bottom of the filter basket 50 as it is inserted into the interior space 44 of the body 40 to properly engage with the sealing surface 49, e.g., part of the sealing surface 9 may be received into the skirt 58. The FIGS. 1-11 embodiment have a similar feature at the filter basket 50 bottom.

Figure 16:
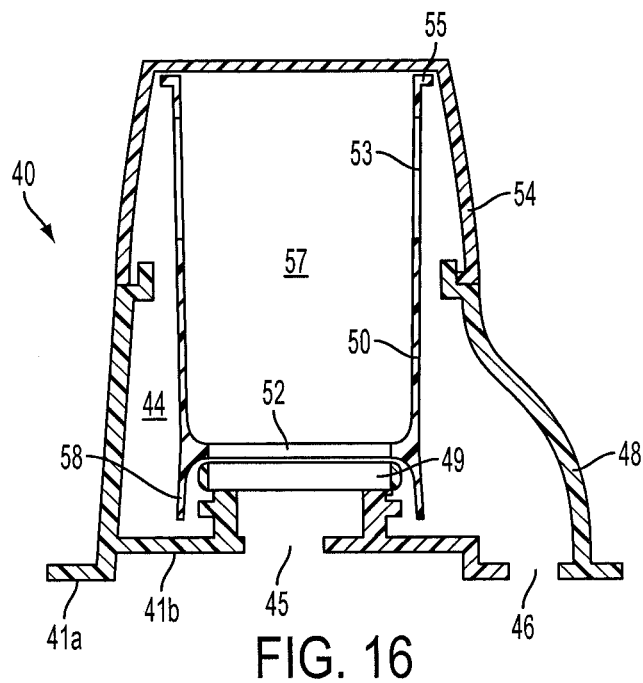
FIG. 16 is a cross sectional view of view of the FIG. 12 embodiment.

FIG. 16 shows that the junction between the cover 54 and the top 42 of the body 40 is located about midway between the bottom 41 of the body 40 and an uppermost surface of the cover 54. Thus, the cover 54 has a sidewall that extends downwardly from the uppermost surface of the cover 54 to help house the space in which the filter basket 50 is enclosed. It should be appreciated that the junction between the cover 54 and the body 40 may be arranged in any suitable location, e.g., nearer the bottom 41 of the body 40. The cover 54 may engage with the body 40 via a threaded connection or locking cam configuration, e.g., where a cam follower on the cover 54 engages with a cam surface on the body 40 so that the cover 54 is sealingly engaged with the body 40.

In accordance with an aspect of the invention, a method of using a reusable beverage cartridge to form a beverage includes inserting a filter basket containing beverage material through an opening in a top of cartridge body to place the filter basket in an interior space of the body, and engaging a cover with the top opening of the body to seal the top opening closed. Thereafter, the body may be placed into a cartridge holder of a beverage forming machine such that a bottom of the body is exposed with the cartridge holder in the open position. As noted above, the bottom may face in an upwardly inclined orientation, e.g., with an axis that is perpendicular to the bottom being at an angle of about 25-85 degrees above the horizontal. The cartridge holder may be moved to a closed position to insert an inlet needle into the inlet opening in the bottom of the body and to insert an outlet needle into the outlet opening in the bottom of the body. As discussed more below, this movement may be done by moving a handle or other actuator of the beverage machine. In the closed position, the bottom of the cartridge may face in a downwardly inclined orientation, e.g., with an axis that is perpendicular to the bottom being at an angle of about 5-90 degrees below the horizontal. Liquid may be introduced into the interior space of the body via the inlet opening, and beverage may be received from the body via the outlet opening.

Figure 17:
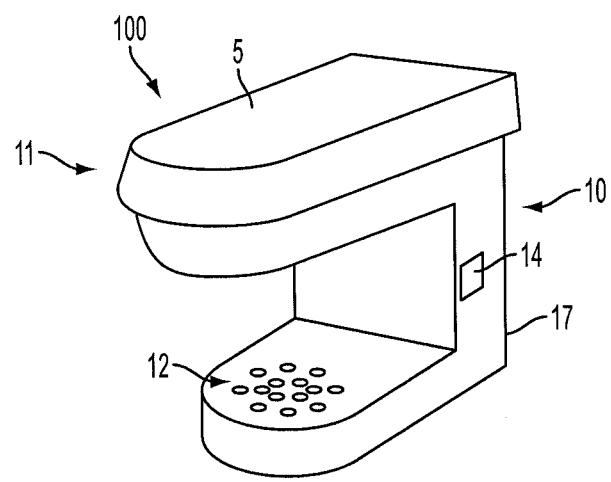
FIG. 17 is a front perspective view of a beverage forming apparatus in an illustrative embodiment.
Figure 18:
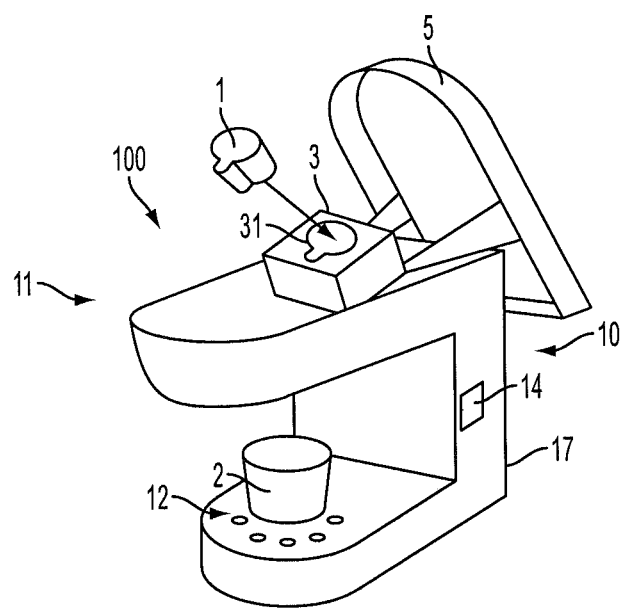
FIG. 18 is a front perspective view of the FIG. 17 embodiment with the cartridge holder in an open position.

FIGS. 17 and 18 show a perspective view of a beverage forming apparatus 100 in an illustrative embodiment that may be used with cartridge embodiments including one or more aspects of the invention. Although the beverage forming apparatus 100 may be used to form any suitable beverage, such as tea, coffee, other infusion-type beverages, beverages formed from a liquid or powdered concentrate, soups, juices or other beverages made from dried materials, or other, in this illustrative embodiment, the apparatus 100 is arranged to form coffee or tea beverages. As is known in the art, a beverage cartridge 4 may be provided to the apparatus 100 and used to form a beverage that is deposited into a container 2. The cartridge 4 may be manually or automatically placed in a cartridge holder 3 of a beverage forming station 11 of the beverage forming machine 10. For example, the cartridge holder 3 may be exposed to receive the cartridge 4 when the user operates a handle 5 or other actuator. With the cartridge 4 placed in the cartridge holder 3, the actuator 5 may be operated to at least partially enclose the cartridge 4, e.g., so that water or other precursor liquid can be introduced into the cartridge 4 to form a beverage. Of course, aspects of the invention may be employed with any suitably arranged apparatus 100, including coffee brewers, carbonated beverage machines, and others arranged to form a beverage regardless of how the beverage is formed. For example, a cartridge 4 may include any suitable materials to form a beverage, such as a carbon dioxide source used to carbonate water, a beverage mix that is dissolved in water to form a beverage, etc.

In this embodiment, the beverage forming machine 10 includes a housing 17 that houses and/or supports components of the machine 10, such as a user interface 14 used to control system operation, and defines a container receiving area 12 at which the container 2 is positionable to receive beverage dispensed by the machine 10 via a beverage outlet.

In accordance with an aspect of the invention, a cartridge holder having an opening arranged to receive and hold a cartridge may be moved between an open position, e.g., in which the opening of the cartridge holder faces a front of the beverage forming machine and is in an upwardly inclined position, and a closed position, e.g., in which the cartridge is at least partially enclosed in a space for forming a beverage. Moving of the cartridge holder between the open position and the closed position may be performed by operating a handle or other actuator. For example, the embodiment of FIGS. 17 and 18 show that when a handle 5 is lifted from the position shown in FIG. 17, a cartridge holder 3 may be exposed for placement of a cartridge 4 in an opening 31 of the holder 3. In the open position, the opening 31 of the cartridge holder 3 may be oriented in an upwardly inclined position with the opening 31 facing toward a front of the machine 10. In this upwardly inclined position, an axis that is perpendicular to the plane of the opening 31 may be arranged at an angle above the horizontal of about 25 to 85 degrees, e.g., about 45 degrees. Such an orientation may make placement of a cartridge 4 in the holder easy and convenient for a user, e.g., the holder 3 may securely hold the cartridge 4 while in the open position. Also, the opening 31 may include a notch to receive the spout 48 so that the cartridge is properly located rotationally to receive inlet and outlet needles. Thereafter, the handle 5 may be returned to the position of FIG. 17, and in response the holder 3 may move to a closed position, e.g., such that the opening 31 is oriented in a downwardly inclined position and inlet and outlet needles 81, 82 are inserted into inlet and outlet openings 45, 46 of the cartridge 4. In the downwardly inclined position, an axis perpendicular to the plane of the opening 31 may be at an angle below the horizontal of 5 to 85 degrees, e.g., about 10-15 degrees.

Figure 19:
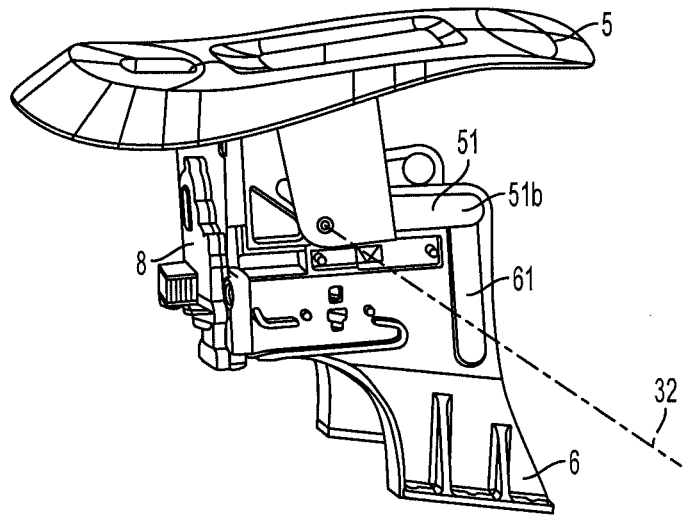
FIG. 19 is a perspective side view of a cartridge holder mechanism in the FIG. 17 embodiment with the cartridge holder in the closed position.
Figure 20:
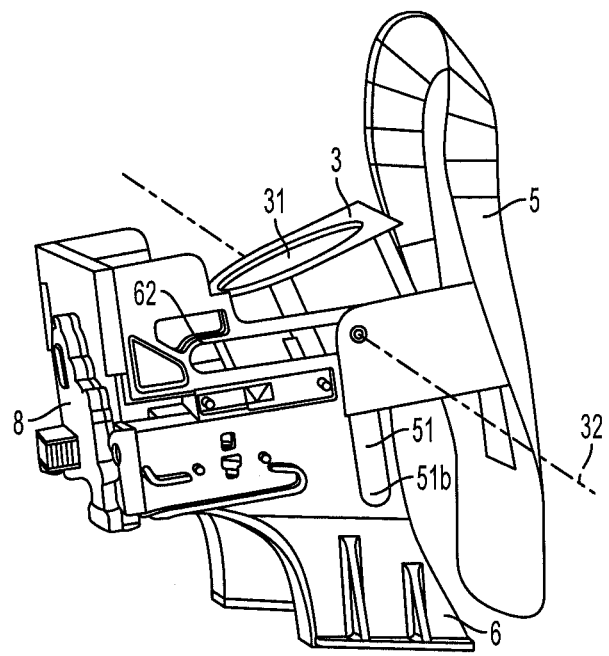
FIG. 20 is a perspective side view of the cartridge holder mechanism in the FIG. 19 embodiment with the cartridge holder in the open position.
Figure 21:
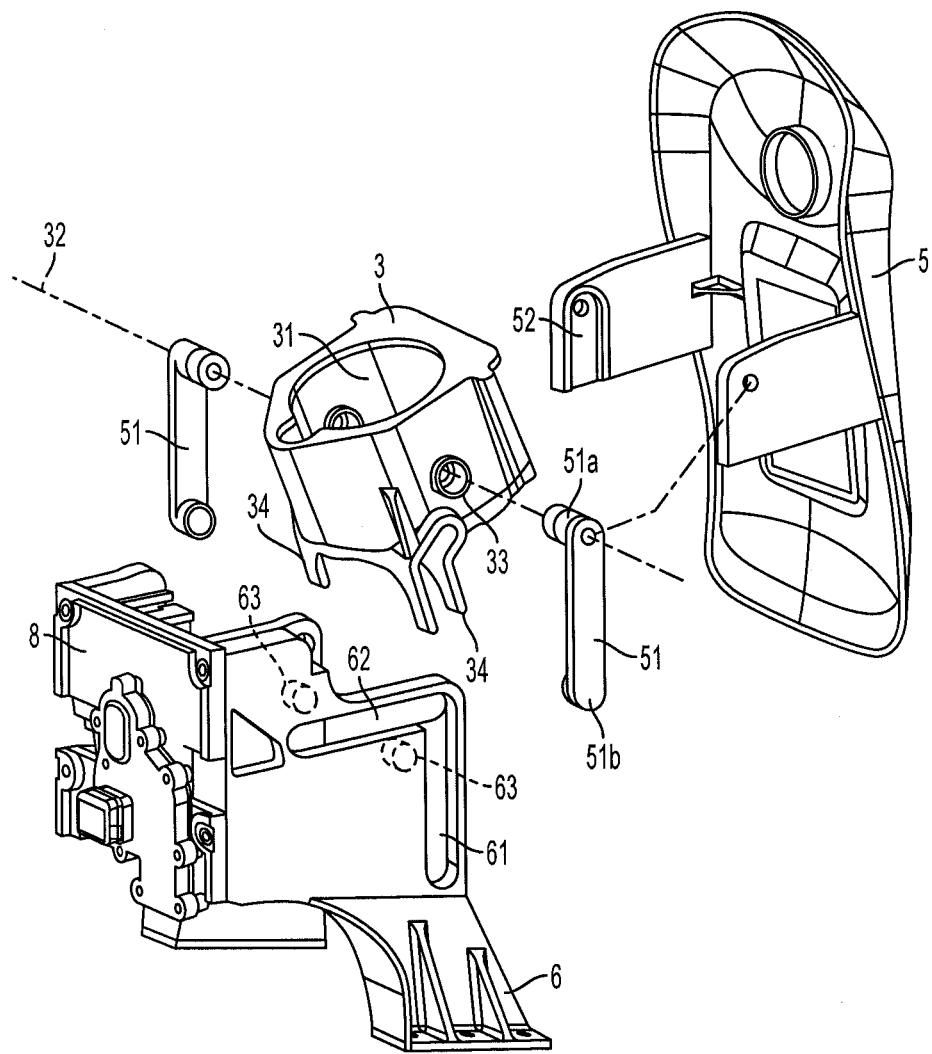
FIG. 21 is an exploded view of the FIG. 19 cartridge holder mechanism.

FIGS. 19 and 20 show a cartridge holder mechanism of the FIG. 17 embodiment isolated from other portions of the beverage forming machine 10 for clarity. In FIG. 19, the cartridge holder 3 is in the closed position (as in FIG. 17), whereas FIG. 20 shows the cartridge holder 3 in the open position. FIG. 21 shows an exploded view of this embodiment, allowing for the viewing of certain components hidden from view in FIGS. 19 and 20. In this embodiment, the cartridge holder 3 includes a pair of pivot pins 33 that are movable along a slot 62 of the frame 6 of the machine 10 so that the holder 3 can be moved along a linear path defined by the slot 62. In addition, the pivot pins 33 define a pivot axis 32 about which the holder 3 can pivot or rotate relative to the frame 6. (The frame 6 may define an interior chassis that supports various components of the machine 10, including a skin or shell sections that define the housing 17. In some arrangements, portions of the frame 6 may define one or more portions of the housing 17.) The cartridge holder 3 also includes a cam 34 located near each the pivot pin 33 and that engages with a cam follower 63 (e.g., a pin, boss or stud) that extends from the frame 6. The cams 34 are shaped, and the cam followers 63 are located, so that as the pivot pins 33 are moved along the slot 62, the cam followers 63 move relative to their respective cam 34 to cause the holder 3 to rotate in at least part of the movement of the pivot pins 33 in the slots 62. In this embodiment, the cartridge holder 3 does not rotate when moving near the closed position. Instead, the cartridge holder 3 moves linearly only, along the linear path defined by the slots 62. This movement may help accurately and reliably insert inlet and outlet needles into corresponding inlet and outlet openings of the cartridge and/or help properly clamp the cartridge 4 between the cartridge holder 3 and a lid or cover 8 that is fixed to the frame 6. However, when the cartridge holder 3 moves nearer the open position, the cam 34 and cam follower 63 engage to cause the holder 3 to pivot about the pivot axis 32 as the pivot pins 33 move in the slots 62. In this embodiment, the cam 34 includes first and second linear portions arranged at an oblique angle to each other. While other arrangements for the cam 34 are possible, such as those including one or more curved portions, this arrangement of the cam 34 allows the holder 3 to move without rotation near the closed position, yet provide rotational movement nearer the open position. While in this embodiment the cam follower is fixed relative to the frame and the cam is fixed relative to the cartridge holder, the positions of the cam and cam follower may be reversed.

As noted above, an actuator may be used to move the cartridge holder between the open and closed positions. In this embodiment, the actuator includes a handle 5 pivotally movable relative to the frame 6 to move the pivot pins 33 of the cartridge holder 3 along the linear path defined by the slots 62. Specifically, the handle 5 may be pivotally connected to the cartridge holder 3 at the pivot pins 33, e.g., by a screw or other fastener (not shown). Also, the handle 5 may include a pair of control arms 51 each having a first end 51a pivotally attached to a pivot pin 33 of the cartridge holder 3 and that is arranged to move in the first slot 62. A second end 51b of the control arms 51 may be arranged to move in a second slot 61 of the frame 6. A portion of the control arms 51 near the first end 51a is received into a recess 52 of the handle 5 so that the control arms 51 are fixed relative to the handle 5, i.e., the control arms 51 cannot rotate relative to the handle 5. A fastener used to attach the handle 5 to the pivot pins 33 may pass through an opening in the first end 51a of the control arms 51, thereby fastening the control arms 51 to the handle 5 as well. The first and second slots 62, 61 may be linear and form a L-shaped slot that is fixed relative to the frame 6.

With the cartridge holder mechanism assembled as in FIGS. 19 and 20, the handle 5 may be lifted from the position shown in FIG. 19 to cause the second end 51b of the control arms 51 to move downwardly in the second slot 61. This causes the first end 51a of the control arms 51 and the attached pivot pins 33 to move rearwardly in the first slots 62. As a result, the cartridge holder 3 moves along the linear path defined by the first slots 62. This movement causes the cam 34 and cam followers 63 to move relative to each other, eventually causing the cartridge holder 3 to rotate about the pivot axis 32 as the cartridge holder 3 nears the open position. Reversing movement of the handle 5 will move the cartridge holder 3 to the closed position, in which the cartridge holder 3 clamps against the lid or cover 8, e.g., to create a seal between the lid or cover 8 and the cartridge 4 and/or the cartridge holder 3. Engagement of the second end 51b of the control arm 51 with the upper end of the second slot 61 may provide the clamping force provided on the cartridge holder 3 at the closed position. As can be seen in FIG. 19, the cam 34 is positioned rearwardly of the pivot axis 32 relative to the linear path defined by the first slots 62 with the cartridge holder 3 in the closed position. Also, as seen in FIGS. 20 and 21, the cam 34 is positioned below the pivot axis 32 with the cartridge holder 3 at the open position.

Figure 22:
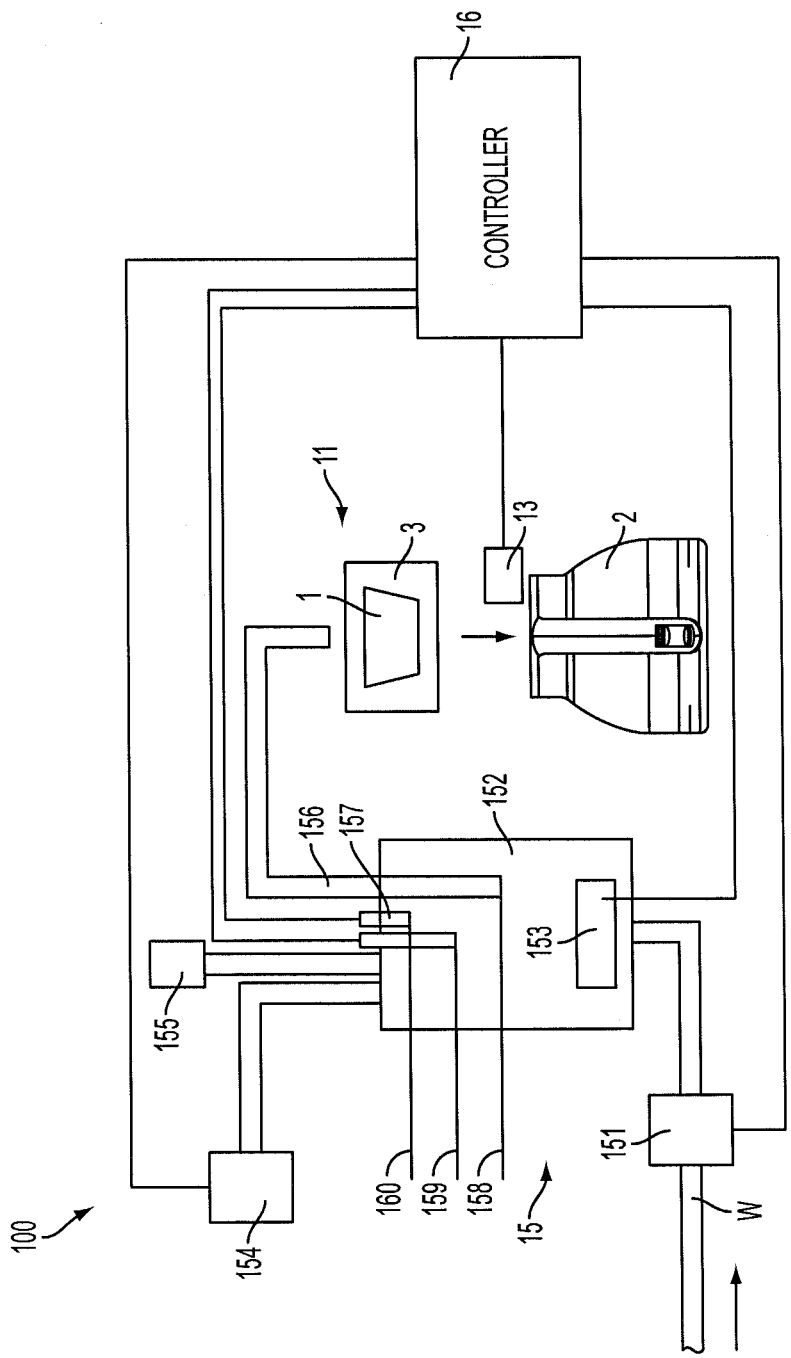
FIG. 22 is a schematic diagram of components of a beverage forming apparatus in an illustrative embodiment.

FIG. 22 shows a schematic block diagram of various components that may be included in a beverage forming apparatus 100 in one illustrative embodiment. Those of skill in the art will appreciate that a beverage forming apparatus 100 may be configured in a variety of different ways, and thus aspects of the invention should not be narrowly interpreted as relating only to one type of beverage forming apparatus. In this embodiment, water or other precursor liquid may be provided by a liquid supply 15 to mix with a beverage material at a beverage forming station 11. The beverage material (such as coffee grounds, tea leaves, a powdered drink mix, etc.) may be provided in a cartridge 4, or not, and beverage produced by mixing the liquid with the beverage material may be dispensed into the container 2 via a beverage outlet.

The liquid supply 15 in this embodiment controls the volume of liquid provided to the beverage forming station 11 by filling the tank to a liquid dispense level 159, 160 and then pressurizing the tank 152 by way of an air pump 154 so that liquid in the tank 152 is forced out of the conduit 156 to the beverage forming station 11. The volume of liquid delivered to the beverage forming station 11 is equal to the volume in the tank 152 between the liquid delivery level 159, 160 and a post-delivery level 158 at a bottom of the conduit 156 in the tank 152. Since there are two delivery levels 159, 160 in this embodiment, two different volumes can be provided to the beverage forming station 11. However, more than two levels, or a single level, may be used.

In this embodiment, the liquid supply 15 provides liquid to the tank 152 via a valve 151 that is coupled to a source W. The source W may have any suitable arrangement, e.g., may provide liquid from a storage tank, a mains water supply or other source. Thus, in some cases, the liquid provided to the tank 152 may vary in temperature by a wide degree depending on various factors, such as time of year, a temperature of a room in which the machine 10 is located, etc. For example, if the source W is a reservoir that is filled by a user, the temperature of liquid in the reservoir may vary between room temperature (e.g., if liquid sits in the reservoir for an extended time) and a cooler temperature (e.g., if the reservoir has just been filled with water that is dispensed from a tap).

To provide liquid to the tank 152 in this embodiment, the valve 151 is controlled by the control circuit 16 to open and close to provide a desired volume of liquid to the tank 152. For example, if the tank 152 is empty or at the post-dispense level 158, the valve 151 may be opened until a conductive probe or other liquid level sensor 157 provides a signal to the control circuit 16 that indicates when liquid arrives at the dispense level 159, 160. In response to the level sensor 157 detecting liquid at the sensor 157, the control circuit 16 may close the valve 151.

Although in this embodiment the liquid level sensor includes a pair of conductive probes capable of contacting liquid in the tank 152 and providing a signal (e.g., a resistance change) indicative of liquid being present at respective dispense levels 159 or 160 in the tank 152, the liquid level sensor may be arranged in other ways. For example, the sensor may include a microswitch with an attached float that rises with liquid level in the tank 152 to activate the switch. In another embodiment, the liquid level sensor may detect a capacitance change associated with one or more liquid levels in the tank, may use an optical emitter/sensor arrangement (such as an LED and photodiode) to detect a change in liquid level, may use a pressure sensor, may use a floating magnet and Hall effect sensor to detect a level change, and others. Thus, the liquid level sensor is not necessarily limited to a conductive probe configuration. Moreover, the liquid level sensor may include two or more different types sensors to detect different levels in the tank. For example, a pressure sensor may be used to detect liquid at the dispense level 160 (e.g., complete filling of the tank 152 may coincide with a sharp rise in pressure in the tank 152), while a conductive probe may be used to detect liquid at the other dispense level 159.

Further, a liquid level sensor need not be used to fill the tank to the dispense level 159, 160. Instead, other techniques may be used to suitably fill the tank 152, such as opening the valve 151 for a defined period of time that is found to correspond to approximate filling of the tank 152 to the desired level. Of course, other arrangements for providing liquid to the tank 152 are possible, such as by a pump (e.g., a centrifugal pump, piston pump, solenoid pump, diaphragm pump, etc.), gravity feed, or other, and the way by which the tank is filled to the dispense level 159, 160 may depend on the technique used to provide liquid to the tank. For example, control of a volume of liquid provided to fill the tank 152 to the dispense level 159, 160 may be performed by running a pump for a predetermined time, detecting a flow rate or volume of liquid entering the tank 152 (e.g., using a flow meter), operating a pump for a desired number of cycles (such as where the pump is arranged to deliver a known volume of liquid for each cycle), detecting a pressure rise in the tank 152 using a pressure sensor, or using any other viable technique.

Liquid in the tank 152 may be heated by way of a heating element 153 whose operation is controlled by the control circuit 16 using input from a temperature sensor or other suitable input. Of course, heating of the liquid is not necessary, and instead (or additionally) the apparatus 100 may include a chiller to cool the liquid, a carbonator to carbonate the liquid, or otherwise condition the liquid in a way that alters the volume of liquid in the tank 152. (Generally speaking, components of the liquid supply 15 that heat, cool, carbonate or otherwise condition liquid supplied to the beverage forming station 11 are referred to as a "liquid conditioner.")

In this embodiment, liquid may be discharged from the tank 152 by an air pump 154 operating to force air into the tank 152 to pressurize the tank and force liquid to flow in the conduit 156 to the beverage forming station 11. Since the conduit extends downwardly into the tank 152, the volume of liquid delivered to the forming station 11 is defined as the volume in the tank 152 between the dispense level 159, 160 and the bottom end of the conduit 156. Again, liquid may be caused to flow from the tank 152 to the beverage forming station 11 in other ways. For example, a pump may be used to pump liquid from the tank 152 to the forming station 11, liquid may be allowed to flow by gravity from the tank 152, and others. A vent 155, which can be opened or closed to vent the tank 152, may be provided to allow the tank 152 to be filled without causing a substantial rise in pressure in the tank 152 and to allow liquid to be delivered from the tank 152 by pressurizing the tank using the air pump 154. In this embodiment, the vent 155 is actually not controlled by the control circuit 16, but remains always open with an orifice of suitable size to allow venting for filling of the tank 152, and air pressure buildup in the tank 152 to allow liquid delivery. Other flow control features may be provided as well, such as a check valve or other flow controller that can prevent backflow in the conduit between the source W and the tank 152, or between the tank 152 and the beverage forming station 11.

The beverage forming station 11 may use any beverage making ingredient, such as ground coffee, tea, a flavored drink mix, or other beverage medium, e.g., contained in a cartridge 4 or not. Alternately, the beverage forming station 11 may function simply as an outlet for heated, cooled or otherwise conditioned water or other liquid, e.g., where a beverage medium is contained in the container 2. Once liquid delivery from the tank 156 to the station 11 is complete, the air pump 154 (or other air pump) may be operated to force air into the conduit 156 to purge liquid from the beverage forming station 11, at least to some extent.

Operation of the valve 151, air pump 154 and other components of the apparatus 100 may be controlled by the control circuit 16, e.g., which may include a programmed processor and/or other data processing device along with suitable software or other operating instructions, one or more memories (including non-transient storage media that may store software and/or other operating instructions), temperature and liquid level sensors, pressure sensors, input/output interfaces, communication buses or other links, a display, switches, relays, triacs, or other components necessary to perform desired input/output or other functions.

The cartridge 4 in this example may be used in a beverage machine to form any suitable beverage such as tea, coffee, other infusion-type beverages, beverages formed from a liquid or powdered concentrate, etc. Thus, the cartridge 4 may contain any suitable beverage medium, e.g., ground coffee, tea leaves, dry herbal tea, powdered beverage concentrate, dried fruit extract or powder, powdered or liquid concentrated bouillon or other soup, powdered or liquid medicinal materials (such as powdered vitamins, drugs or other pharmaceuticals, nutriaceuticals, etc.), and/or other beverage-making material (such as powdered milk or other creamers, sweeteners, thickeners, flavorings, and so on). In one illustrative embodiment, the cartridge 4 contains a beverage medium that is configured for use with a machine that forms coffee and/or tea beverages, however, aspects of the invention are not limited in this respect.

As used herein, "beverage" refers to a liquid substance intended for drinking that is formed when a liquid interacts with a beverage medium. Thus, beverage refers to a liquid that is ready for consumption, e.g., is dispensed into a cup and ready for drinking, as well as a liquid that will undergo other processes or treatments, such as filtering or the addition of flavorings, creamer, sweeteners, another beverage, etc., before being consumed.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A reusable beverage cartridge for use in a beverage forming machine, comprising:
    a cartridge body having a bottom including a flat surface, a top, a sidewall extending between the bottom and the top, and an interior space, the bottom including an inlet opening and an outlet opening each arranged to respectively receive an inlet needle and an outlet needle of a beverage forming machine, the inlet opening arranged to receive an inflow of liquid from the inlet needle into the interior space and the outlet opening arranged to provide a beverage to the outlet needle, the top of the body having an access opening that provides access to the interior space;
    a filter basket defining a beverage material space in which to hold a beverage material used to form a beverage, the filter basket having a top opening through which the beverage material space is accessible, an inlet to receive liquid into the beverage material space, and a filter portion to allow flow of beverage out of the beverage material space, the filter basket being receivable into the interior space of the cartridge body through the access opening of the cartridge body; and
    a cover arranged to removably engage with the top of the cartridge body at the access opening to seal the access opening of the body closed, the cover being removable from the cartridge body to allow removal of the filter basket from the interior space.

2. The cartridge of claim 1, wherein the cover seals the top opening of the filter basket closed when engaged with the cartridge body at the access opening.

3. The cartridge of claim 1, wherein the bottom includes first and second flat surfaces that are parallel and not co-planar, the first flat surface including the outlet opening and the second flat surface including the inlet opening.

4. The cartridge of claim 3, wherein the second flat surface is nearer the cartridge body top than the first flat surface.

5. The cartridge of claim 1, wherein the outlet opening is near a periphery of the bottom and the inlet opening is near a center of the bottom.

6. The cartridge of claim 1, wherein the filter basket includes a bottom that is spaced above the inlet opening with the filter basket received in the interior space.

7. The cartridge of claim 1, wherein the filter basket has a bottom surface opposite the top opening that seals to an interior surface of the body to define an inlet flow path between the inlet opening and the filter basket inlet.

8. The cartridge of claim 7, wherein the filter basket inlet is located at a bottom of the filter basket, and the bottom surface of the filter basket includes an annular portion of the bottom of the filter basket.

9. The cartridge of claim 8, wherein the body includes an inlet chamber in the interior space between the inlet opening and a sealing surface that engages the annular portion of the bottom of the filter basket.

10. The cartridge of claim 1, wherein the filter basket is cylindrical in shape with the top opening located at one end of the cylindrical shape.

11. The cartridge of claim 10, wherein the filter portion is located in an upper portion of a sidewall of the cylindrical shape near the top opening.

12. The cartridge of claim 11, wherein the filter basket includes a rim around the top opening that is spaced above a portion of the body that defines the access opening of the body and engages with the cover.

13. The cartridge of claim 1, wherein the filter basket is arranged in the interior space such that liquid introduced into the inlet opening flows upwardly through the inlet into the beverage material space of the filter basket, flows outwardly through the filter portion and flows downwardly to the outlet opening of the body.

14. The cartridge of claim 1, wherein the sidewall includes a spout portion in communication with the outlet opening.

* * * * *